United States Patent [19]
Groff

[11] Patent Number: 6,093,099
[45] Date of Patent: Jul. 25, 2000

[54] COMBINE ROW CROP HEADER AUGER

[76] Inventor: Jerry L. Groff, 1320 Wellington, Imperial, Nebr. 69033

[21] Appl. No.: 09/179,657

[22] Filed: Oct. 27, 1998

[51] Int. Cl.[7] ...................................................... A01F 12/34
[52] U.S. Cl. ................................ 460/71; 56/14.5; 460/32; 460/33
[58] Field of Search ................................. 460/71, 72, 32, 460/33, 70, 110, 114, 35, 46, 80; 56/14.1, 14.5, 14.3, 14.6, 153

[56] References Cited

U.S. PATENT DOCUMENTS

| | | | |
|---|---|---|---|
| 2,073,742 | 3/1937 | Gilson | 460/46 |
| 2,349,380 | 5/1944 | Rietz | 460/71 |
| 3,324,639 | 6/1967 | Halls et al. | 56/14.5 |
| 4,505,279 | 3/1985 | Campbell et al. | 130/27 T |
| 4,972,665 | 11/1990 | Hicks | 56/14.5 |
| 5,192,246 | 3/1993 | Francis et al. | 460/72 |
| 5,254,036 | 10/1993 | Johnson et al. | 460/71 |
| 5,894,716 | 4/1999 | Haldeman et al. | 56/14.5 |
| 5,964,080 | 10/1999 | Leeb | 56/14.3 |

FOREIGN PATENT DOCUMENTS

| 405130807 | 5/1993 | Japan | 460/32 |
|---|---|---|---|

OTHER PUBLICATIONS

John Deere "Performance Enhancements" Brochure, p. 30, 1998.

*Primary Examiner*—Thomas B. Will
*Assistant Examiner*—Árpád Fábián Kovács
*Attorney, Agent, or Firm*—Zarley, McKee, Thomte Voorhees & Sease; Dennis L. Thomte

[57] ABSTRACT

A crop-engaging angle member is mounted on the outer forward end of each of the crop-engaging paddles of a combine header auger to assist in conveying crop material rearwardly towards the intake end of the feederhouse of the combine.

18 Claims, 2 Drawing Sheets

COMBINE ROW CROP HEADER AUGER

BACKGROUND OF THE INVENTION

1. Field of the Invention

This invention relates to a combine row crop header auger and more particularly to a combine row crop header auger having crop engaging means thereon at the center thereof to assist in the movement of crop material from the header into the feederhouse which extends upwardly and rearwardly from the header towards the cylinder and concave area of the combine.

2. Description of the Related Art

Corn heads or headers for a combine normally include a platform having a plurality of row units at the forward end thereof which are adapted to cut the corn stalks and to convey the same rearwardly onto the platform. An elongated header auger or platform auger is rotatably mounted on the platform and has a pair of opposing auger flights thereon which convey the crop material towards the center of the platform. The crop material is conveyed rearwardly from the center of the header auger into the lower forward end of a feederhouse which conveys the crop material upwardly and rearwardly to the threshing cylinder and concave area of the combine. In many corn header augers, a plurality of flexible paddles are secured thereto at the center thereof which engage the crop material to assist in moving the crop material rearwardly from the platform into the feederhouse. In some situations, the corn stalks and crop material are not sufficiently moved rearwardly toward the feederhouse by the paddles which results in plugging and clogging of the crop material at the center of the header auger and at the forward end of the feederhouse due to the fact that the flexible paddles do not sufficiently contact the crop material to move the same rearwardly from the header auger into the feederhouse.

SUMMARY OF THE INVENTION

A combine row crop head is disclosed which includes a platform having an elongated, substantially horizontally disposed rotatable header auger or platform auger mounted thereon having opposite ends. The header auger is comprised of an elongated, cylindrical tube having opposing auger flights positioned thereon for directing crop material towards the center of the header auger. The header auger has a plurality of paddle supports secured to the tube adjacent the center thereof. A flexible paddle is secured to each of the paddle supports and extends outwardly therefrom. An elongated angle member is secured to the outer forward surface of each of the paddles and has a plurality of crop-gripping teeth provided thereon. As the header auger is rotated and the crop material is moved towards the center of the platform, the elongated angle members engage the crop material and convey the crop material rearwardly from the header auger towards the intake end of the feederhouse which extends upwardly and rearwardly from the platform.

A principal object of the invention is to provide a combine row crop header auger having crop engaging means thereon at the center thereof.

Still another object of the invention is to provide a combine row crop header auger having crop-engaging means at the center thereof in the form of angular members having crop-gripping teeth provided on the leading edge thereof.

Still another object of the invention is to provide a combine row crop header auger having crop-engaging means at the center thereof which normally do not become detached therefrom.

Still another object of the invention is to provide combine row crop headers having crop-engaging means at the center thereof which are easily attached to rubber paddles on the header auger to greatly reduce dry stalk build-up.

Still another object of the invention is to provide an invention of the type described which provides continuous flow to the feederhouse of the combine resulting in increased field speed.

These and other objects will be obvious to those skilled in the art.

DESCRIPTION OF THE PREFERRED EMBODIMENTS

Figure 1:
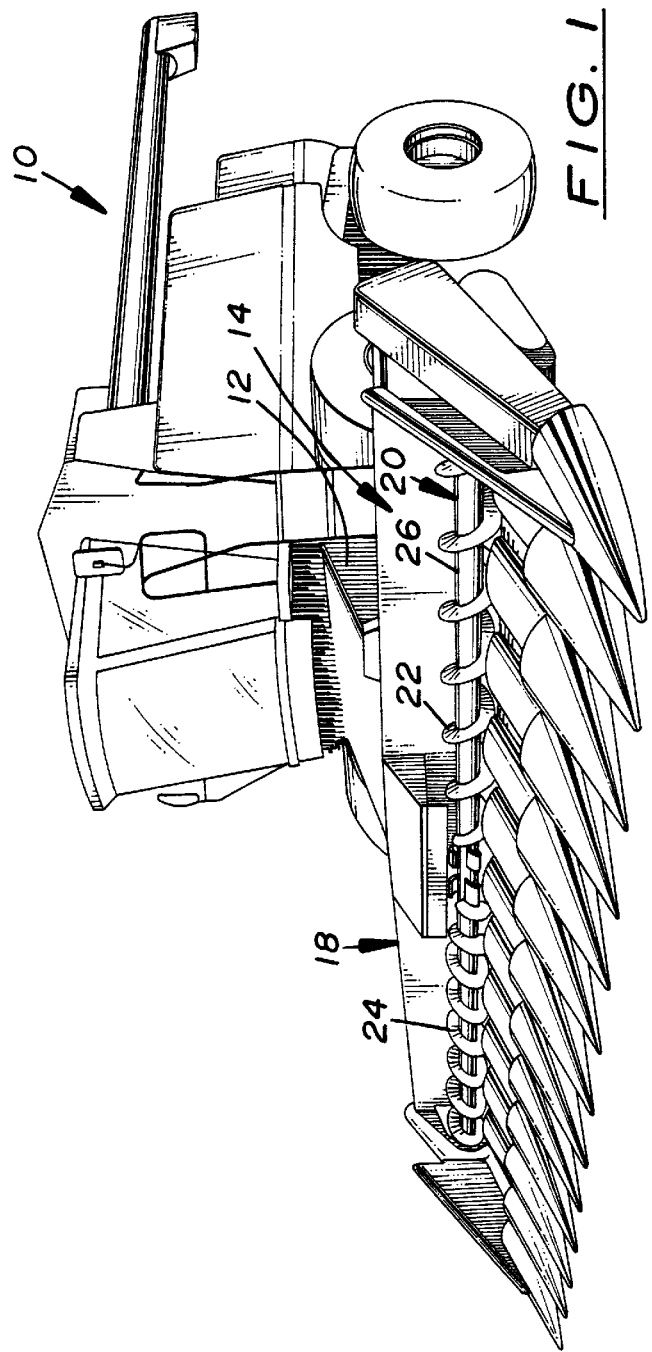
FIG. 1 is a front perspective view of a conventional combine having a row crop head or header thereon.
Figure 2:
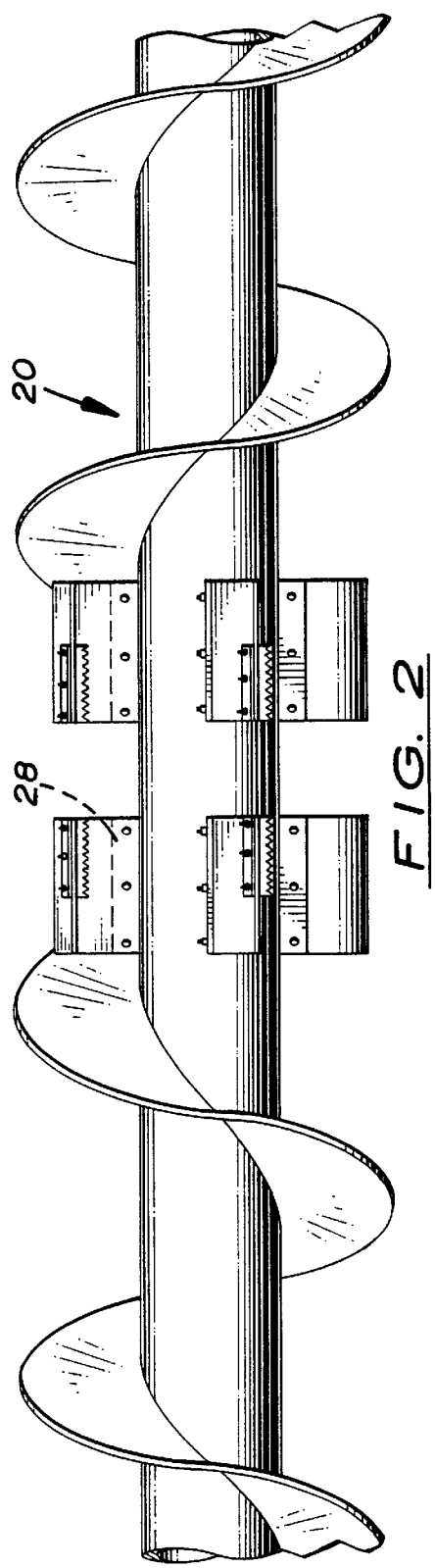
FIG. 2 is a front view of a typical header auger having rubber paddles mounted thereon with the crop engagement means of this invention mounted thereon.

In FIG. 1, the numeral 10 refers generally to a typical combine having a feederhouse 12 extending forwardly and downwardly therefrom which supports a row crop head or header 14 thereon. In the embodiment illustrated in the drawings, the row crop head 14 is a corn head and includes a plurality of row units 16 extending forwardly from the forward end of the platform 18 for cutting the corn stalks and delivering the same rearwardly onto the platform 18. The numeral 20 refers to a conventional header or platform auger having opposing auger flights 22 and 24 mounted on a cylindrical tube 26 for conveying the crop material towards the center of the platform 18. A vast majority of the conventional header augers 20 are provided with a plurality of spaced-apart paddle supports 28 which are welded to the tube 26 and which extend outwardly therefrom and which are adapted to have flexible rubber paddles 30 secured thereto. As the header auger 20 is rotated, the rubber paddles 30 engage the crop material at the center of the platform 18 to convey the same rearwardly into the intake end of the feederhouse 12. However, in certain harvest conditions, such as dry harvest conditions, the paddles 30 do not sufficiently engage the crop material to facilitate movement of the crop into the feederhouse 12. It is for that reason that the crop-engaging means of this invention has been provided, as will now be described.

A crop-engaging means in the form of an elongated angle member 32 is secured to the outer end of each of the paddles 30 so that the angle member 32 extends forwardly from the outer forward surface 34 of the paddle 30, as illustrated in the drawings. As used herein, the term "forward" refers to the leading side of the paddle 30 which engages the crop material 36. The angle member 32 includes a base portion 38 which is positioned adjacent the forward surface 34 of the paddle 30. Angle member also includes a flange portion 40 which extends forwardly from the outer end of the base portion 38 and which has a plurality of teeth 42 provided on the leading edge thereof. Base portion 38 is provided with a plurality of spaced-apart openings 44 provided therein which are adapted to register with openings 46 punched in the outer ends of the paddle 30. Angle member 32 is secured to the paddle 30 by extending bolts 48 through the openings 44, through the openings 46 and through the openings 50 in a backing plate 52 positioned at the rearward side of the paddle 30. Nuts 54 are threadably mounted on the bolts 48, as illustrated in the drawings.

Preferably, the angle member 32 is approximately six inches long with the base portion 38 having a dimension of one inch by six inches. Preferably, the flange 40 has a dimension of one inch by six inches. Preferably, the distance between the teeth 42 is approximately ⅝ths inch. It is also preferred that the elongated angle member 32 be comprised of a fourteen gauge mild steel material although aluminum could be used. The reason for using fourteen gauge mild steel or aluminum is to prevent damage to the internal components of the combine should the angle member 32 become inadvertently detached from the paddle 30 and find its way into the combine.

Figure 3:
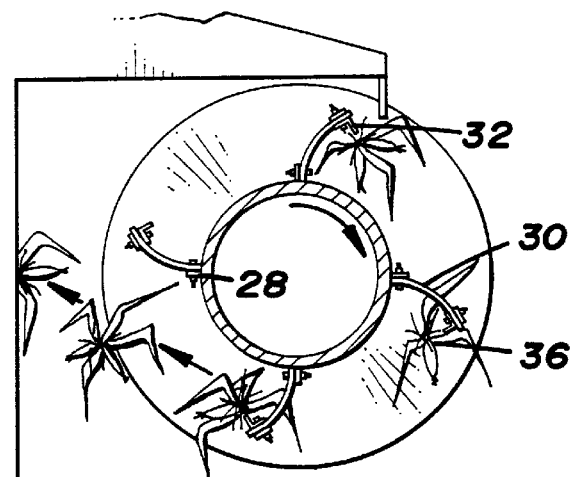
FIG. 3 is a sectional view of the header auger illustrating the crop-engaging means of this invention mounted on the rubber paddles.
Figure 4:
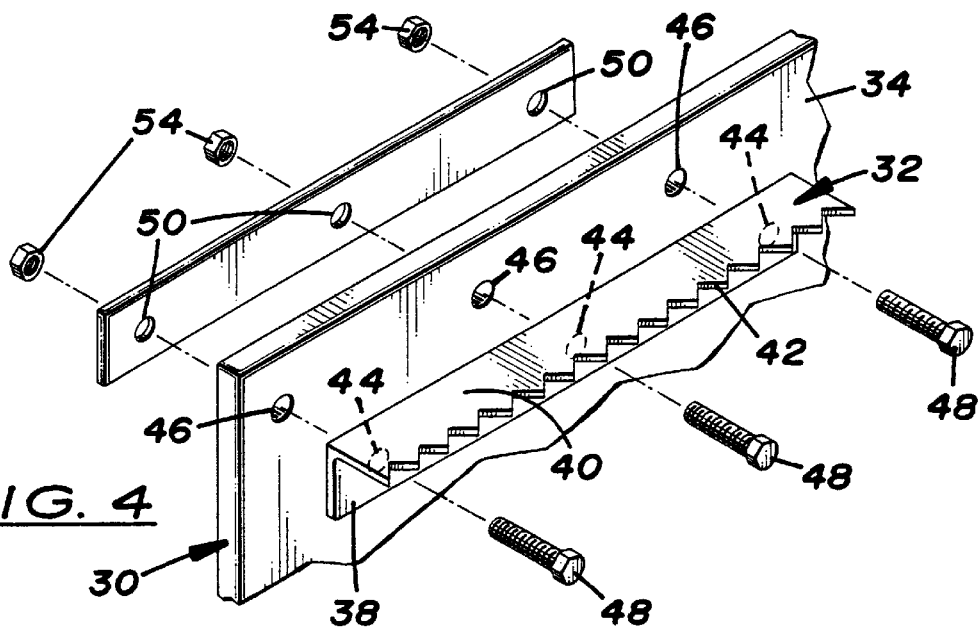
FIG. 4 is an exploded perspective view illustrating the crop-engaging means of this invention and one of the associated rubber paddles.
Figure 5:
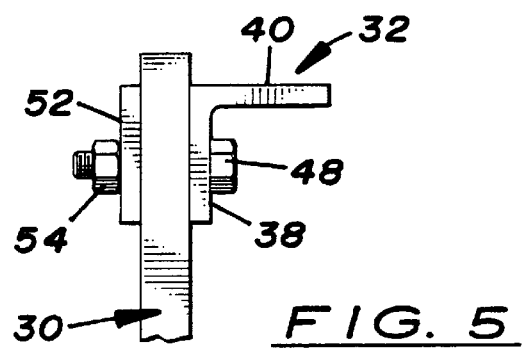
FIG. 5 is a partial end view of one of the rubber paddles having the crop-engaging means of this invention mounted thereon.

As the header auger 20 is rotated in the direction as illustrated by the arrow in FIG. 3, the elongated angle members 32 engage and grip the crop material 36 to positively engage the same and move the crop material rearwardly into the feederhouse 12.

Thus, it can be seen that the invention accomplishes at least all of its stated objectives.

I claim:

1. In combination:
   a combine row crop header including an elongated, substantially horizontally disposed rotatable header auger having opposite ends;
   said header auger comprising an elongated, cylindrical tube having opposing auger flights positioned thereon for directing crop material towards the center of said header auger;
   said header auger having at least one paddle support secured to said tube adjacent the center thereof;
   a flexible paddle secured to said paddle support which extends outwardly therefrom;
   said paddle having a forward leading surface, a rearward trailing surface, an outer end, and an inner end;
   and a crop engagement means secured to said paddle and extending forwardly from said forward leading surface of said paddle for engagement with crop material adjacent said header auger for directing the crop material rearwardly from said header auger.

2. The combination of claim 1 wherein a plurality of spaced-apart paddle supports are secured to said tube and wherein a paddle having a crop engagement means thereon is secured to at least some of said paddle supports.

3. The combination of claim 1 wherein said paddle support comprises an elongated flat plate secured to said tube, said paddle support having a longitudinal axis which is disposed substantially parallel to the longitudinal axis of said header auger, said paddle support having inner and outer ends; said paddle comprising a generally rectangular member having its inner end secured to said outer end of said paddle support; said crop engagement means comprising an elongated angle member secured to said generally rectangular member.

4. The combination of claim 3 wherein said angle member comprises a flat base portion positioned adjacent said forward leading surface of said paddle and a flange member extending forwardly from said base portion.

5. The combination of claim 4 wherein said flange has a leading forward leading edge which has a plurality of crop-gripping teeth provided thereon.

6. The combination of claim 5 wherein said angle member is comprised of a metal material.

7. The combination of claim 4 wherein a flat backing plate is positioned at said rearward trading surface of said paddle and wherein bolt members extend through said base plate, said paddle, and said backing plate.

8. The combination of claim 7 wherein said backing plate is comprised of a metal material.

9. The combination of claim 1 wherein said crop engagement means extends substantially transversely from said forward leading surface of said paddle at the outer end thereof.

10. In combination with a combine header including an elongated, substantially horizontally disposed rotatable header auger having opposite ends, the header auger comprising an elongated, cylindrical tube having opposing auger flights positioned thereon for directing crop material towards the center of the header auger, the header auger having at least one paddle support secured to the tube adjacent the center thereof, and a flexible paddle, having a forward leading surface, secured to the paddle support which extends outwardly therefrom, comprising:
   a crop engagement means secured to said paddle and extending forwardly from said forward leading surface of said paddle for engagement with crop material adjacent said header auger for directing the crop material rearwardly from said header auger.

11. The combination of claim 10 wherein a plurality of spaced-apart paddle supports are secured to said tube and wherein a paddle having a crop engagement means thereon is secured to at least some of said paddle supports.

12. The combination of claim 10 wherein said paddle support comprises an elongated flat plate secured to said tube, said paddle support having a longitudinal axis which is disposed substantially parallel to the longitudinal axis of said header auger, said paddle support having inner and outer ends; said paddle comprising a generally rectangular member having its inner end secured to the outer end of said paddle support; said crop engagement means comprising an elongated angle member secured to said forward leading surface of said generally rectangular member.

13. The combination of claim 12 wherein said angle member comprises a flat base portion positioned adjacent said forward leading surface of said paddle and a flange member extending forwardly from said base portion.

14. The combination of claim 13 wherein said flange has a leading forward edge which has a plurality of crop-gripping teeth provided thereon.

15. The combination of claim 14 wherein said angle member is comprised of a metal material.

16. The combination of claim 12 wherein a flat backing plate is positioned at said rearward trailing surface of said paddle and wherein bolt members extend through said base plate, said paddle, and said backing plate.

17. The combination of claim 16 wherein said backing plate is comprised of a metal material.

18. The combination of claim 10 wherein said crop engagement means extends substantially transversely from said forward leading surface of said paddle at the outer end thereof.

* * * * *